United States Patent
Hong et al.

(10) Patent No.: US 7,600,919 B2
(45) Date of Patent: Oct. 13, 2009

(54) MOTOR LUBRICANT CYCLING SYSTEM

(75) Inventors: Alex Hong, Kaohsiung (TW); Hong Yin Rong, Kaohsiung (TW)

(73) Assignee: Sunonwealth Electric Machine Industry Co., Ltd., Kaohsiung (TW)

( * ) Notice: Subject to any disclaimer, the term of this patent is extended or adjusted under 35 U.S.C. 154(b) by 697 days.

(21) Appl. No.: 11/222,944

(22) Filed: Sep. 12, 2005

(65) Prior Publication Data

US 2006/0251350 A1   Nov. 9, 2006

(30) Foreign Application Priority Data

May 3, 2005   (TW) .............................. 94114239 A

(51) Int. Cl.
*F16C 32/06* (2006.01)
(52) U.S. Cl. .................. 384/100; 384/107; 384/112
(58) Field of Classification Search ................ 384/100, 384/107, 112–115, 120, 125, 129, 279, 329, 384/371, 425
See application file for complete search history.

(56) References Cited

U.S. PATENT DOCUMENTS

| | | | | |
|---|---|---|---|---|
| 3,256,049 A | * | 6/1966 | Josephson et al. | 384/100 |
| 3,703,221 A | * | 11/1972 | Merkle et al. | 384/465 |
| 5,715,116 A | * | 2/1998 | Moritan et al. | 384/115 |
| 5,716,141 A | * | 2/1998 | Chen | 384/114 |
| 5,984,525 A | * | 11/1999 | Ikeda et al. | 384/125 |
| 6,336,745 B1 | * | 1/2002 | Horng et al. | 384/279 |
| 6,384,495 B1 | * | 5/2002 | Suzuki et al. | 310/67 R |
| 6,517,247 B2 | * | 2/2003 | Cheng | 384/279 |
| 6,661,131 B2 | * | 12/2003 | Fukutani | 310/51 |
| 6,832,853 B2 | * | 12/2004 | Fujinaka | 384/100 |
| 6,848,830 B1 | * | 2/2005 | Li | 384/114 |
| 6,869,221 B2 | * | 3/2005 | Horng et al. | 384/425 |
| 7,001,074 B2 | * | 2/2006 | Dittmer et al. | 384/107 |
| 7,008,112 B2 | * | 3/2006 | Yamashita et al. | 384/119 |
| 7,048,444 B2 | * | 5/2006 | Kurimura et al. | 384/119 |
| 7,052,254 B2 | * | 5/2006 | Lin | 384/107 |
| 7,109,620 B2 | * | 9/2006 | Fujii et al. | 310/90 |

* cited by examiner

*Primary Examiner*—Marcus Charles
(74) *Attorney, Agent, or Firm*—Bacon & Thomas, PLLC

(57) ABSTRACT

The invention relates to a motor lubricant cycling system, wherein a plurality of slots are disposed in the inner wall of the shaft tube in contact with the bearing, one end of the slot is connected to the conjunction of the top side of the bearing and the shaft, the lubricant, due to the pump effect, elevates along the shaft when the motor is rotating at high speed and is sucked in the slot by a backflow suction, and the other end of the slot is connected to the lubricant container beneath the bearing in formation of a guiding path dedicated to the lubricant cycling. According, the lubricant can be recycled for operation so as to reduce the noise resulting from the motor operation and prolong the life cycle.

9 Claims, 11 Drawing Sheets

MOTOR LUBRICANT CYCLING SYSTEM

FIELD OF THE INVENTION

The invention relates to a motor lubricant cycling system, which guides the lubricant to constantly backflow and cycle between the shaft and the bearing inside the shaft tube and prevents the lubricant from leaking and draining so as to protect the motor and avoid the attrition between the shaft and the bearing.

BACKGROUND OF THE INVENTION

A lubricant is the lubricating medium for the motor shaft to deal with the rotation of the bearing in an attempt to alleviate the abrasive loss therebetween. As such, how to make the most of the optimal lubricating effect of the lubricant and prevent the lubricant from leaking and draining are the two major subjects to overcome the abrasive loss out of operation.

In the past, the method against lubricant leakage is to add oil seal or washer on both sides of the bearing. However, such measure just delays the leakage. While the shaft is rotating at high speed, the lubricant subject to the centrifugal force resulting from the pump effect will form a thin lubricant film, which keeps spinning upwardly due to the rotation of the shaft, and deposits at the oil seal or the washer as a result of the blockage. In case of no proper guiding backflow channel, the deposited lubricant will be flung off at high speed to drain the lubricant. Consequently, instead of attaining a direct lubricant storage goal, such method can only temporarily get away with the drainage.

Accordingly, with reference to FIG. 1 of the Taiwan Patent Publication No. 456473 "Positioning structure of bearing and shaft tube", the shaft tube 22 has a positioning hole 220 therein. A recess on the boundary of the positioning hole where corresponds to the bearing 20 is formed a lubricant storage space 222 such that, on the one hand, the centering shift of the bearing 20 can be avoided, and on the other hand, the additional lubricant storage space 222 is provided to store the lubricant so as to prevent it from leaking and draining.

SUMMARY OF THE INVENTION

Although the positioning hole 220 of the aforementioned patent has the recess in formation of the lubricant storage space 222 and the lubricant refill hole 224 over one side capable of filling the lubricant in the lubricant storage space 222 for lubricant storage, there is no guiding path dedicated for looping and cycling the lubricant. Hence, the lubricant will still leak from the slit between the shaft and the bearing, failing to achieve a long-haul lubrication effect. In this regard, it is necessary to dispose a lubricant refill hole 224 additionally for refilling the lubricant from time to time.

For sake of preventing the motor from having attrition between the shaft and the bearing, lowering the noise and extending the life cycle, in addition to solving the lubricant leakage and drainage issue, a motor lubricant cycling system capable of continuously guiding lubricant to backflow and cycle needs to be addressed as well.

In view of the demand, the invention thus provides a motor lubricant cycling system, wherein the shaft tube of the motor is disposed a bearing therein, the shaft hole of the bearing is for inserting in the shaft so as to rotate in the hole, and the inner wall of the shaft tube in contact with the bearing is disposed more than one slots with their one end connected to the conjunction between the top side of the bearing and the shaft and the other end connected to the lubricant container beneath the bearing so as to form a guiding path dedicated for cycling lubricant. Therefore, when the motor shaft is rotating at high speed, the lubricant, due to the effect of the pump, rises along the shaft and the shaft hole. When rising to the end of the slot corresponding to the top side of the bearing, the lubricant is sucked in the slot by a backflow suction and is looped down the slot to the lubricant container of the shaft. Such means not only prevents the lubricant from draining, but guides the lubricant to repeatedly backflow and cycle, making the motor free of the attrition between the shaft and the bearing thereof.

DETAILED DESCRIPTION OF THE PREFERRED EMBODIMENT

The invention relates to a motor lubricant cycling system, which is disposed more than one slot in the inner wall in contact with the bearing. One end of the slot is connected to the conjunction of the top face of the bearing and the shaft, and another end is connected to the lubricant container beneath the bearing in formation of a guiding path dedicated for cycling the lubricant for the purpose of reuse.

Several preferred embodiments in the following are presented to describe the relevant positions of all parts in the present invention.

Figure 1:
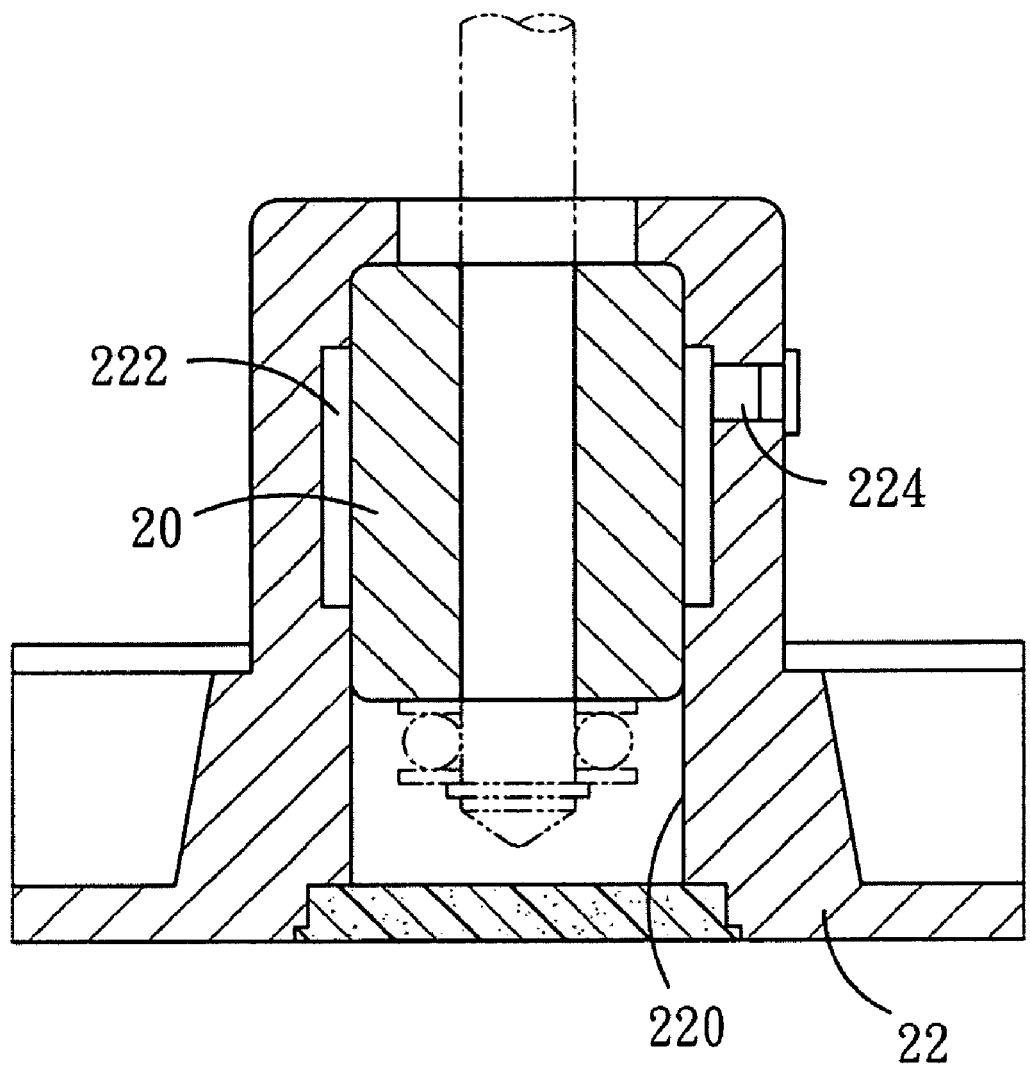
FIG. 1 is a cross-sectional schematic view in association with the Taiwan Patent Publication No. 456473 "Positioning structure of bearing and shaft tube"
Figure 2:
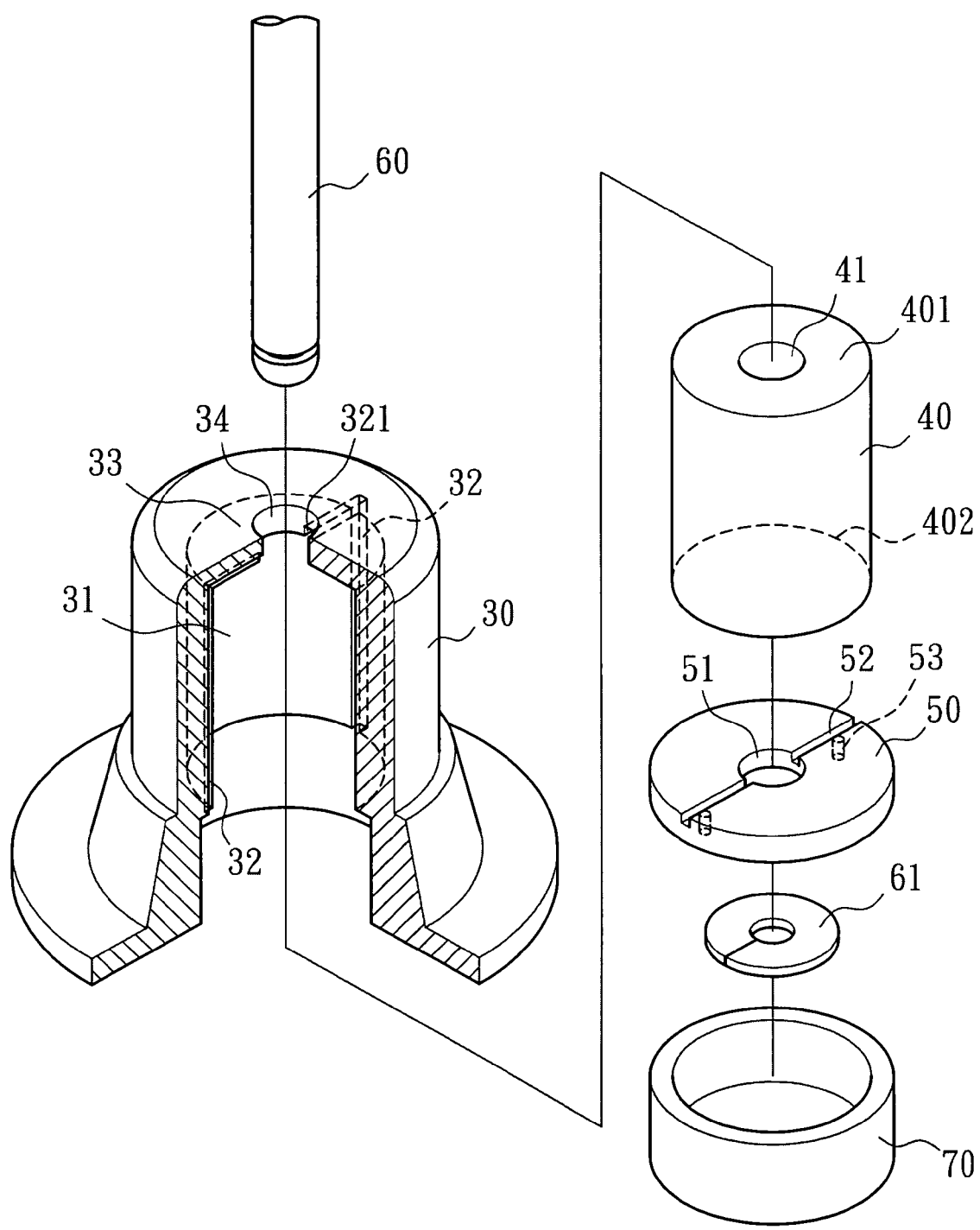
FIG. 2 is a exploded schematic view of the first preferred embodiment of the present invention (including the first structure implementation of the washer)
Figure 3:
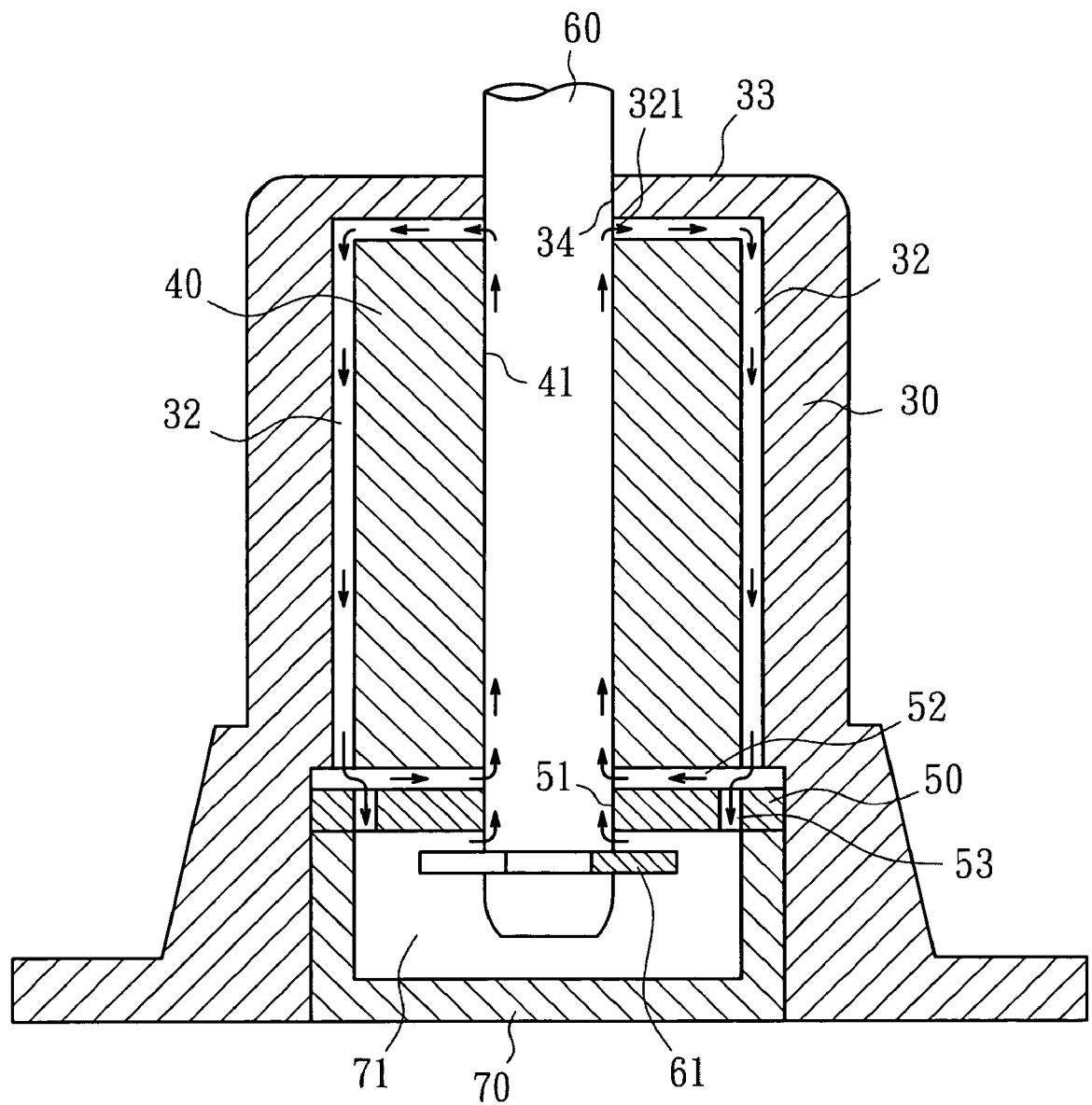
FIG. 3 is a cross-sectional schematic view of the first preferred embodiment of the present invention.

FIG. 2 and FIG. 3 are schematic views showing the first preferred embodiment in the present invention. There is an blocking part 33 on top of the shaft tube 30. The shaft tube 30 is disposed a bearing 40 therein. Beneath the bearing 40 is disposed a washer 50. A shaft hole 41 is located at the center of the bearing 40. The blocking part 33 and the washer 50 have the center holes 34, 51 at the center respectively. A shaft 60 sequentially penetrates through the center hole 34 of the blocking part 33, the shaft hole 41 and the center hole 51 of the washer 50 and is fastened by a snap ring 61. A bottom cap 70 is disposed underneath the washer 50 so as to form a lubricant container 71. The inner wall 31 of the shaft tube 30 in contact with the bearing 40 is disposed more than one axial slots 32. The top side of the slot 32 corresponds to the top face 401 of the bearing 40, traverses the enclosed end 33, and is further connected to the center hole 34 to form an orifice 321. More than one axial slots 52 are disposed on the washer 50 where corresponds to the bottom side 402 of the bearing 40. Both sides of the slot are connected to the center hole 51 of the washer 50 and the outer edge, and the slot 52 is penetrated by the vertical lubricant holes 53.

As a consequence, when the motor shaft 60 is rotating at high speed, the lubricant, due to the pump effect, elevates along the shaft 60 and the shaft hole. Upon ascending to the slot 32 and passing by the orifice 321, the lubricant is sucked in the slot 32 by a suction and backflows downwardly via the slot. The loop-back lubricant can flow to the shaft 60 through the slot 52 of the washer 50 to keep cycling or backflow to the lubricant container 71 via the oil hole 53 of the washer 50 to further elevate along the shaft 60 so that the lubricant is recycled and reused repeatedly.

Moreover, the washer of the invention also has the following types of structure implementations.

Figure 4:
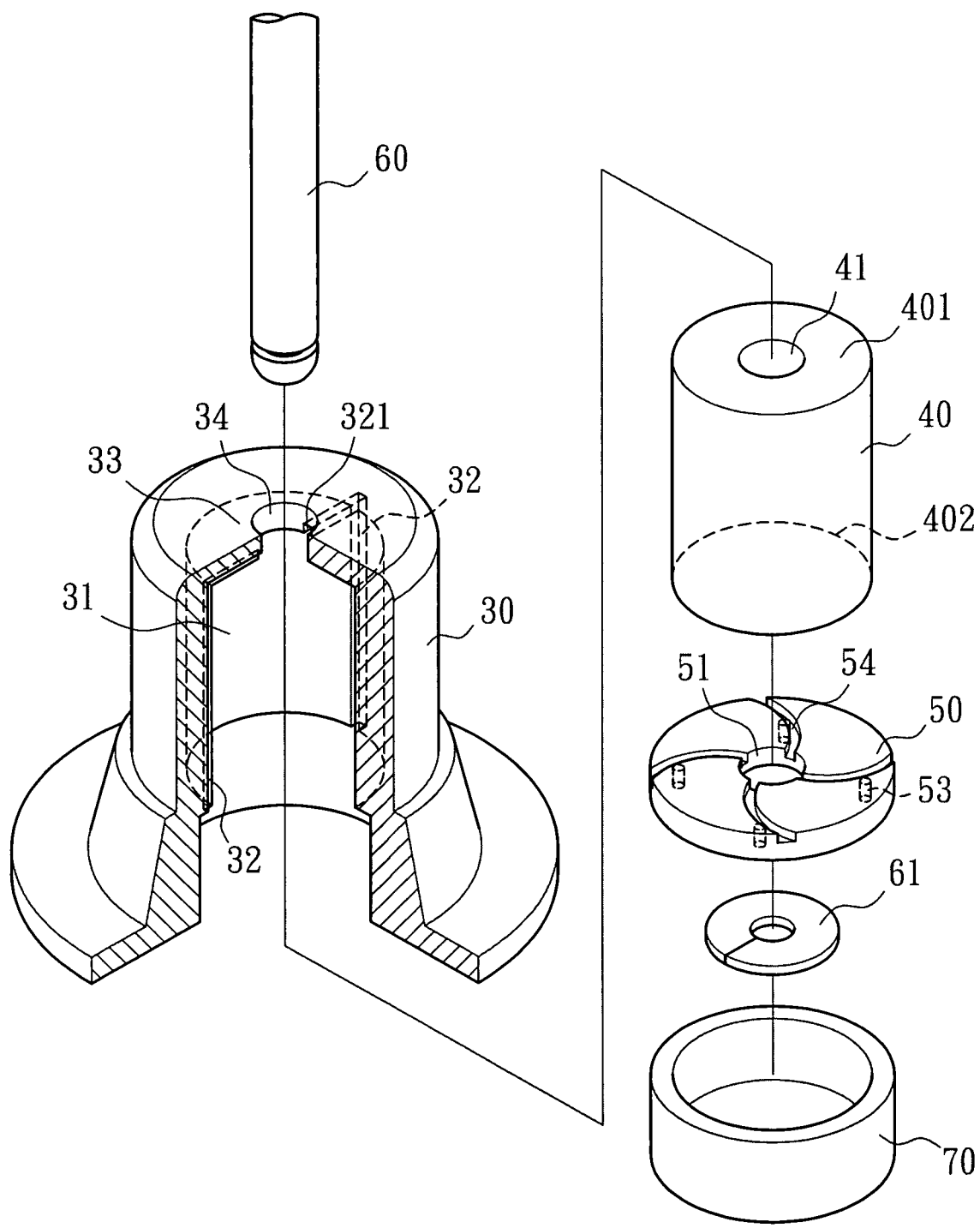
FIG. 4 shows the second structure implementation of the washer in the present invention.

As shown in FIG. 4, the slots 54 of the washer may be in form of more than one radial arcs and the form thereof adopts four slots 54. Both ends of the slot 54 have to be connected to the center hole 51 and the outer rim of the washer 50, and oil holes are provided to vertically go through the slots 54.

Figure 5:
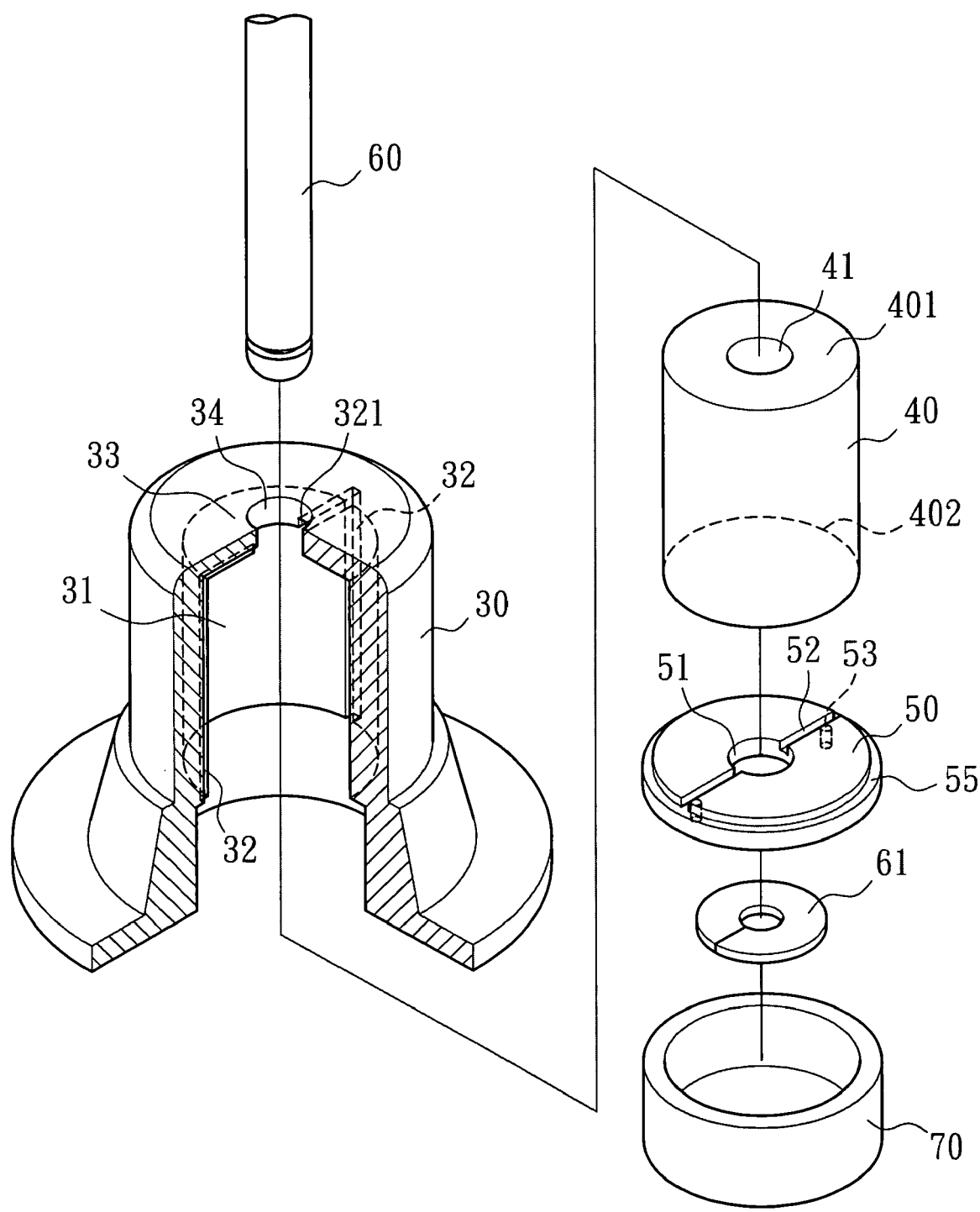
FIG. 5 shows the third structure implementation of the washer in the present invention.

As shown in FIG. 5, in addition to the slots and the vertically-penetrating oil holes 53 therein, the washer 50 has an outer ring slot 55 disposed along the circumference thereby to facilitate the circulation of the lubricant.

Figure 6:
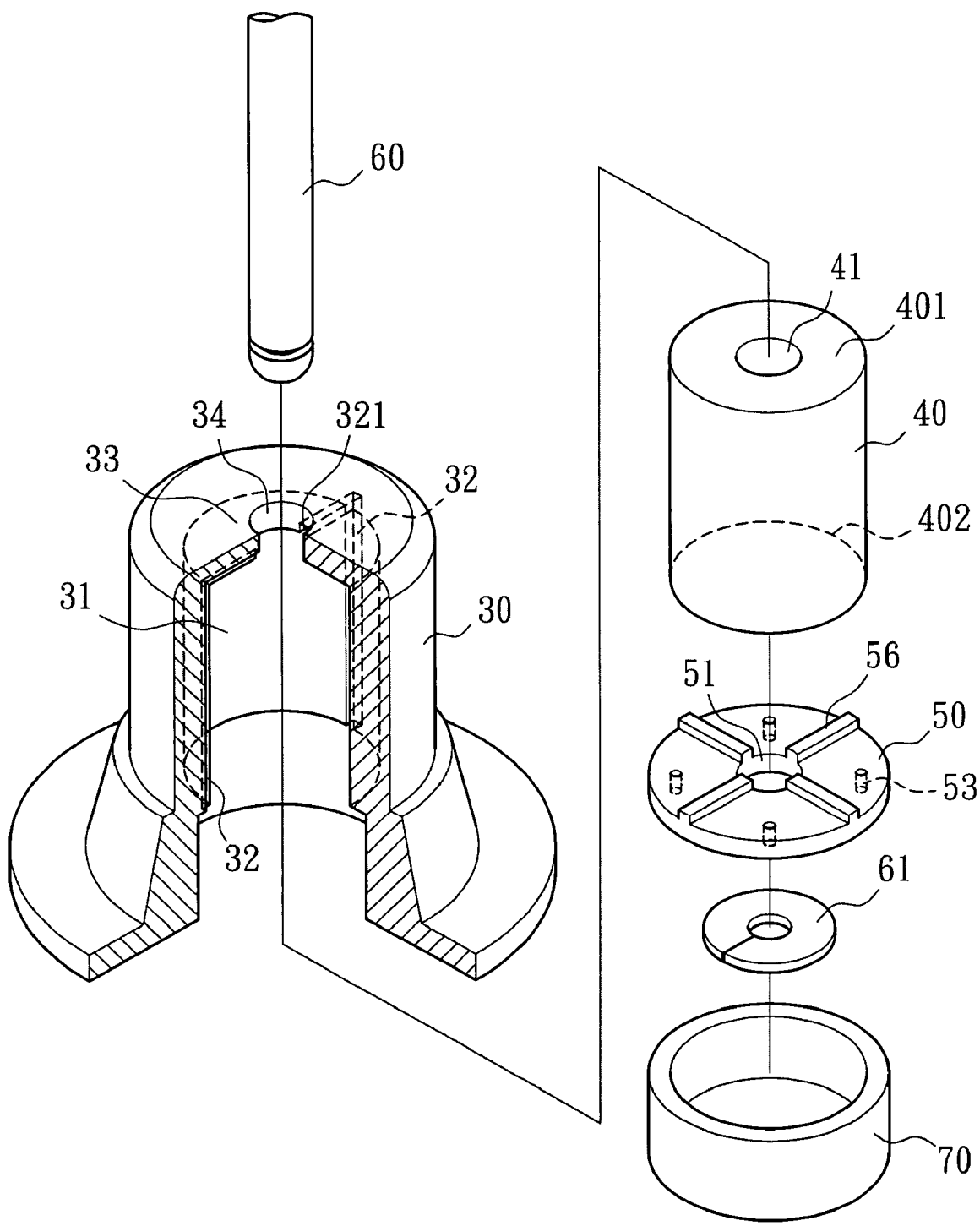
FIG. 6 shows the fourth structure implementation of the washer in the present invention.

As shown in FIG. 6, a plurality of raised strips 56 aligned in a radial form are disposed on the washer 50 so that the space between every two adjacent raised strips 56 is formed for circulation of the lubricant and the oil holes 53 are disposed to vertically go through the space.

Figure 7:
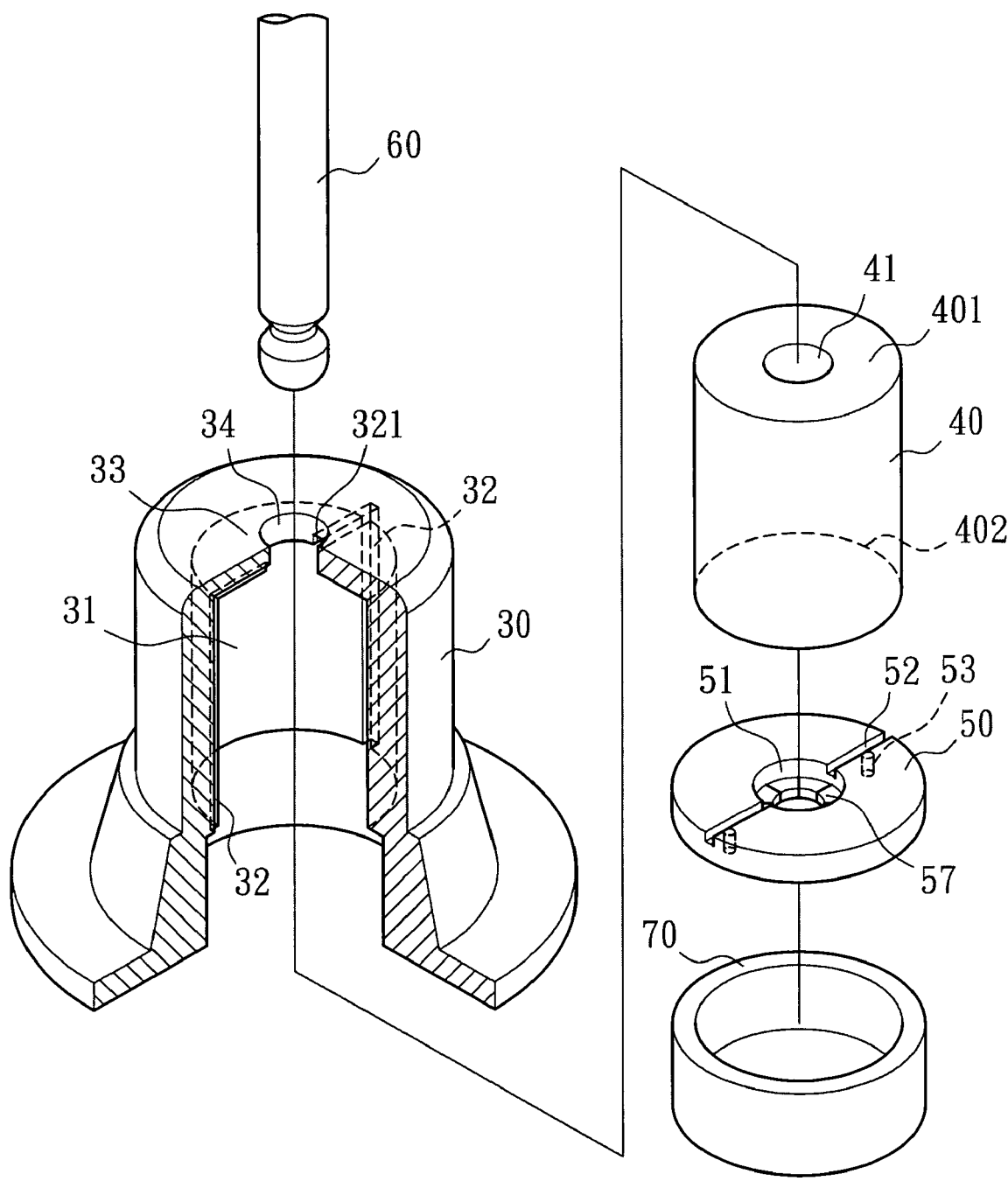
FIG. 7 shows the fifth structure implementation of the washer in the present invention.

As shown in FIG. 7, a plurality of toothed fasteners 57 are disposed inside the center hole 51 of the washer 50 so that the fasteners 57 are used to fix the end of the shaft 60, serving for the fixing purpose at the same time to get rid off the application of the snap ring.

Figure 8:
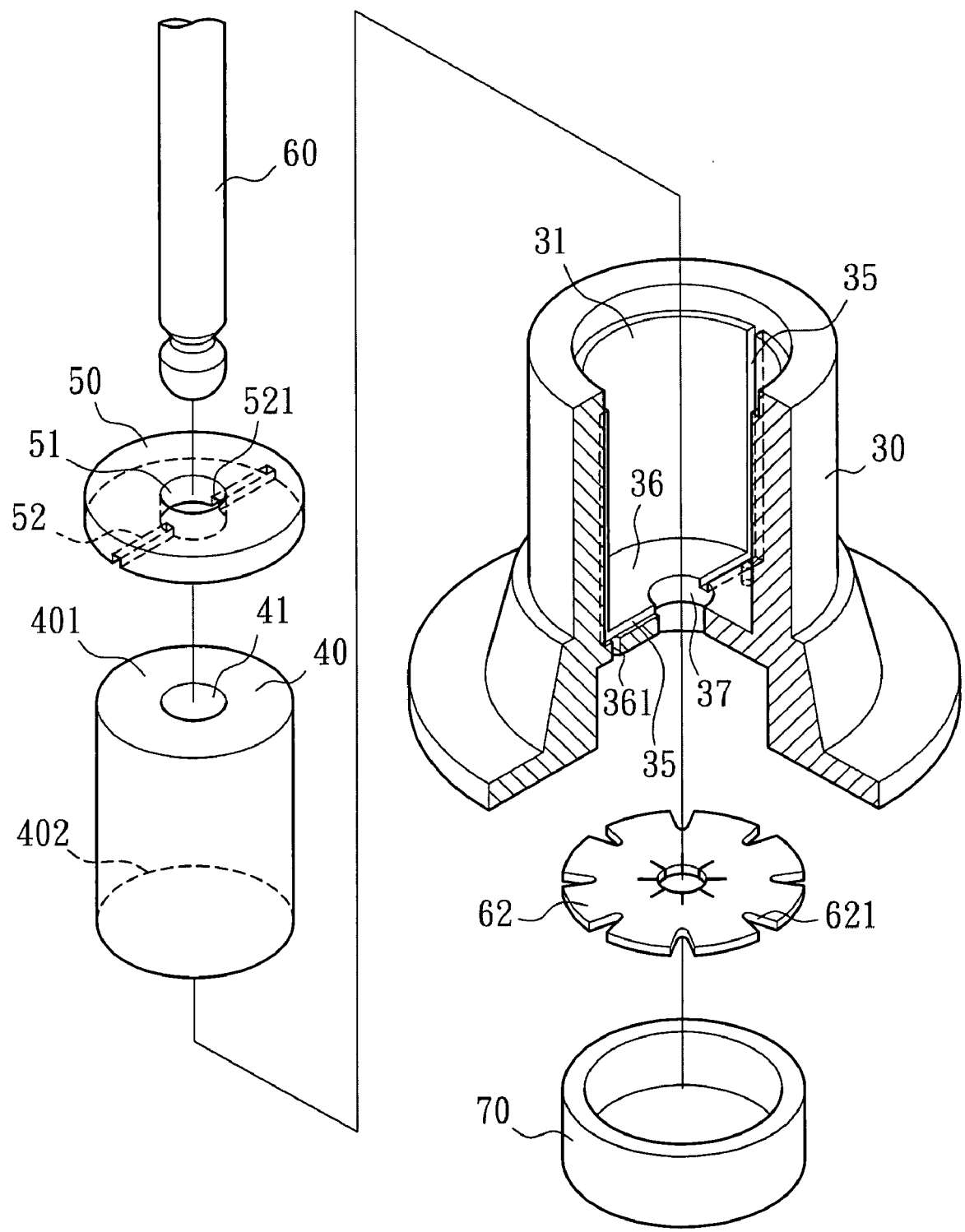
FIG. 8 is an exploded schematic view of the second preferred embodiment.
Figure 9:
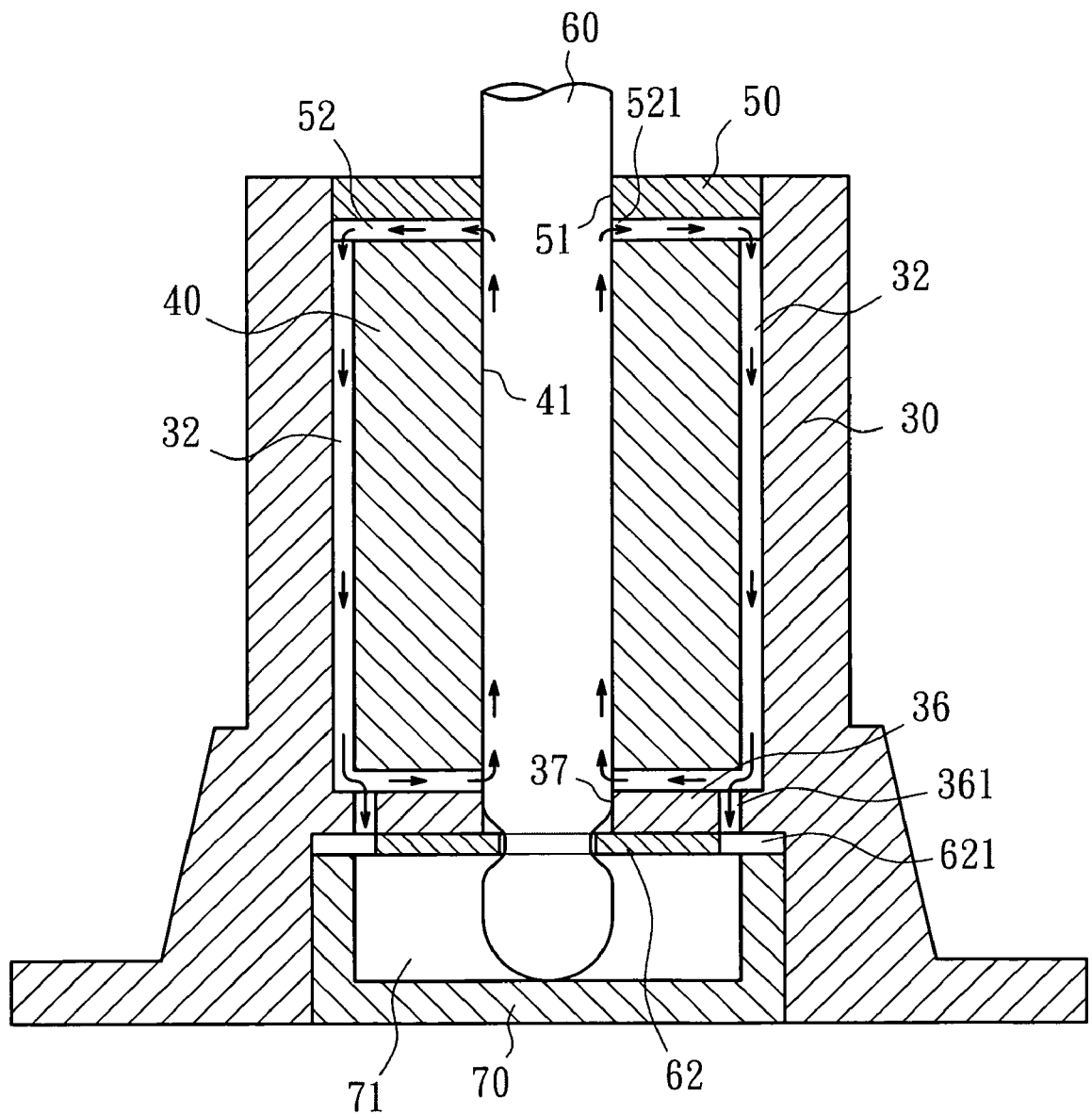
FIG. 9 is an cross-sectional schematic view of the second preferred embodiment.

FIG. 8 and FIG. 9 show the second preferred embodiment of the present invention, wherein the shaft tube 30 is disposed a blocking plate 36 therein, a bearing 40 is placed on top of the blocking plate 36, a washer 50 is disposed on the bearing 40, the bearing 40 has a shaft hole 41 at the center, the washer 50 and the blocking plate 36 have respective center holes 51, 37, a shaft 60 sequentially penetrates the center hole 51 of the washer 50, the shaft hole 41 and the center hole 37 of the blocking plate 36, a retaining ring 62 is used to fix the shaft 60, and a bottom cap 70 is disposed beneath the retaining ring 62 so as to form a lubricant container 71 therein. More than one axial slots 35 are disposed on the inner wall 31 of the shaft tube 30 in contact with the bearing 40. The bottom portion of the slot 35 corresponds to the bottom side of the bearing 40 and traverses the blocking plate 36 to further connect to the center hole 37. The slots on the blocking plate 36 have the vertically-penetrating oil holes 361. The outer rim of the retaining ring where corresponds to the oil holes 361 has a plurality of gaps 621. More than one axial slots 52 are also disposed in the washer 50 where corresponds to the top side 401 of the bearing 40, and both ends of the slot 52 have to be connected to the center hole 51 and the outer rim of the washer 50 respectively.

As such, when motor shaft 60 is rotating at high speed and the lubricant elevates to the orifice 521 of the slot 52 in the washer 50, the lubricant will be sucked in the slot 52 by a backflow suction to flow downwardly along the slot 35 in the inner wall 31 of the shaft tube 30 so as to backflow to the shaft 60 for continuous cycling. The lubricant also backflows to the lubricant container 71 via the oil hole 361 of the blocking plate and elevate along the shaft 60 so as to be cycled and operated repeatedly.

Besides the aforementioned preferred embodiment regarding a plastic shaft tube, the present invention can also adopt the preferred embodiment using metal shaft tube.

Figure 10:
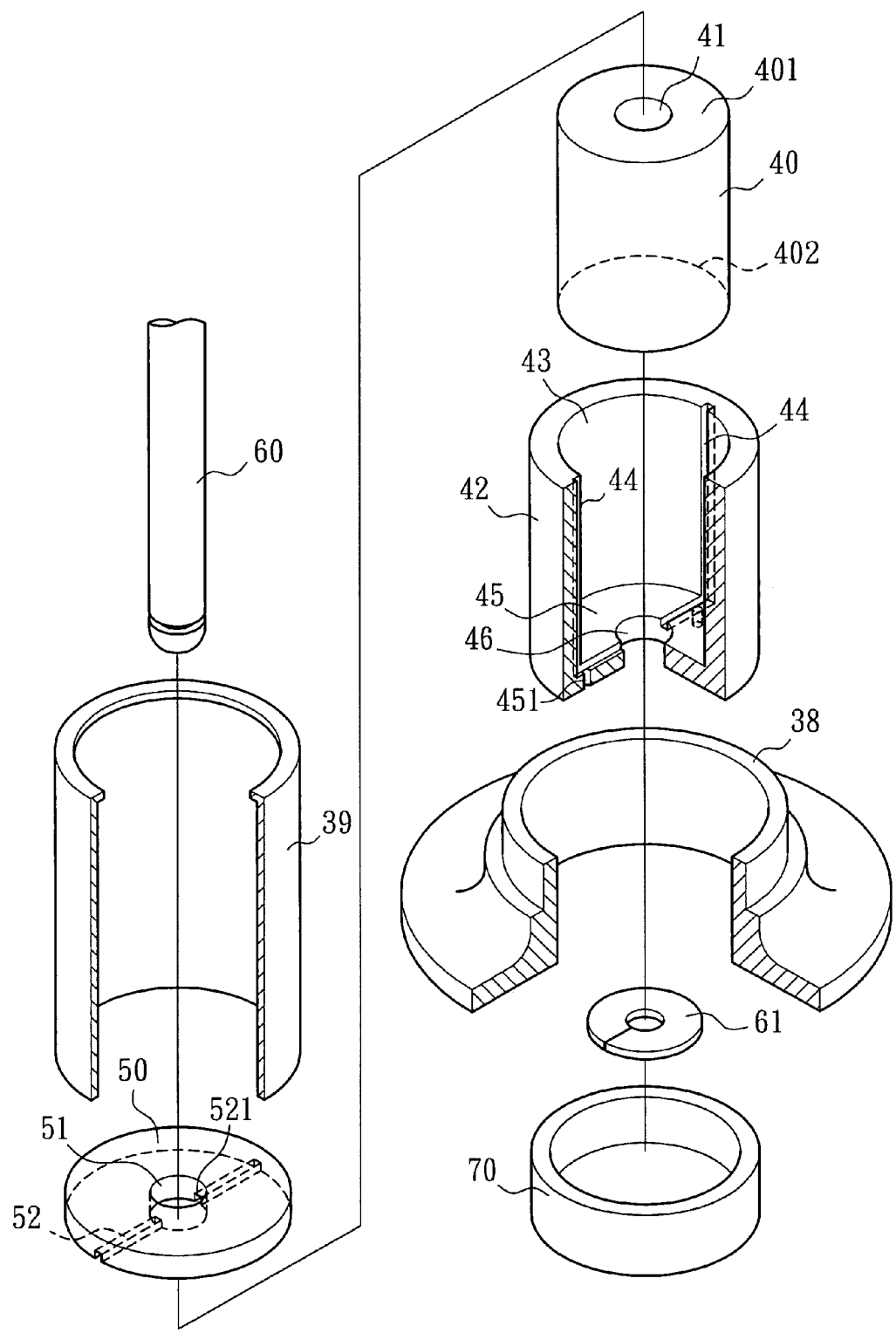
FIG. 10 is an exploded schematic view of the third preferred embodiment.
Figure 11:
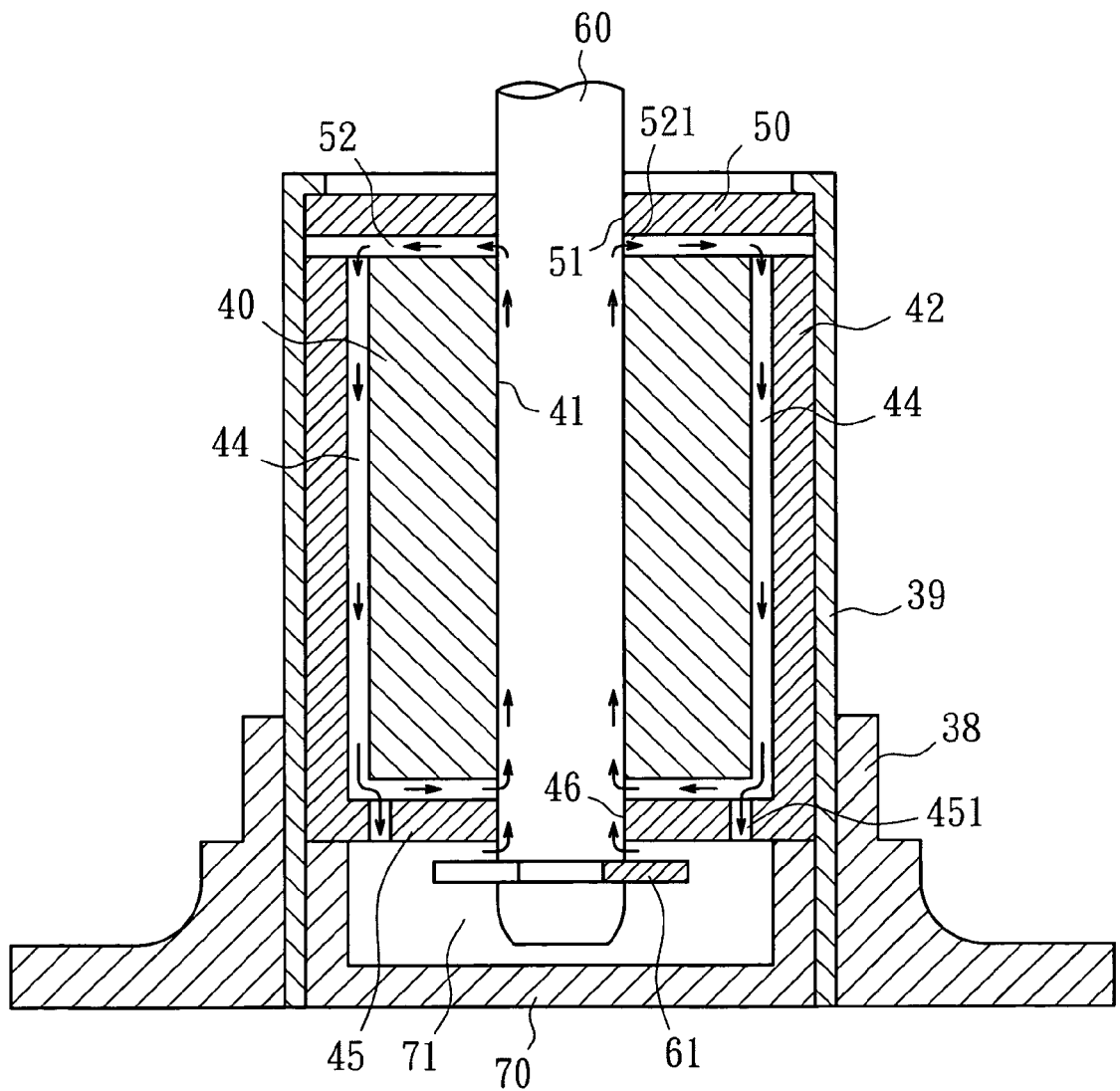
FIG. 11 is a cross-sectional schematic view of the third preferred embodiment.

FIG. 10 and FIG. 11 illustrate the third preferred embodiment of the present invention, wherein a metal tube 39 is disposed on a shaft holder 38, a shaft sleeve 42 is disposed in the metal tube 39, the shaft sleeve 42 has a blocking part 45 over the bottom side, a bearing is placed on top of the blocking part 45, a washer 50 is disposed on the bearing 40, the bearing has a shaft hole 41 at the center, the washer 50 and the blocking part 45 of the shaft sleeve have respective center holes 51, 46, a snap ring 62 is used to fix the shaft 60 after a shaft 60 sequentially penetrates through the center hole 51 of the washer 50, the shaft hole 41 and the center hole 46 of the blocking part 45, and a bottom cap 70 is disposed underneath the blocking part 45 so as to form a lubricant container 71 therein. The inner wall 43 of the shaft sleeve 42 in contact with the bearing 40 is disposed more than one axial slots 44. The bottom side of the slot 44 where corresponds to the bottom side 402 of the bearing 40 traverses the blocking part 45 and is connected to the center hole 46. The portion of the slot 44 where corresponds to the blocking part 45 is vertically penetrated through by the oil holes 451. The washer 50 where corresponds to the top side 401 of the bearing 40 is also disposed more than one axial slots 52 and both sides of the slot 52 have to be connected to the center hole 51 and the outer rim of the washer 50.

Therefore, when the motor shaft 60 is rotating at high speed, the lubricant that elevates to the orifice 521 of the slot 52 in the washer 50 along the shaft 60 and the shaft hole 41 will be sucked in the slot 52 by the backflow suction and flow downwardly via the slot 44 in the inner wall 43 of the shaft sleeve 42 to the shaft 60 for the continuous cycling or backflows to the lubricant container 71 through the oil hole 451 of the blocking part 45 and further elevates along the shaft 60 so as to be cycled and operated repeatedly.

The present invention, by virtue of the aforementioned design, not only prevents the lubricant from leaking and draining, but also guides the lubricant to be continuously cycled and operated. The motor is protected to prolong the life cycle by avoiding the attrition between the shaft and the bearing and reducing the noise arising from the motor operation. Therefore, the present invention not only has a novelty and a progressiveness, but also has an industry utility.

While the invention has been described in terms of what is presently considered to be the most practical and preferred embodiments, it is to be understood that the invention needs not be limited to the disclosed embodiments. On the contrary, it is intended to cover various modifications and similar arrangements included within the spirit and scope of the appended claims, which are to be accorded with the broadest interpretation so as to encompass all such modifications and similar structures.

What is claimed is:

1. A motor lubricant cycling system, comprising:
    a shaft tube;
    a bearing disposed inside said shaft tube and having a shaft hole at a center thereof;
    a shaft penetrating said shaft hole and rotating therein; and
    a plurality of first slots disposed in an inner wall of said shaft tube in contact with said bearing with one end of said first slot connected to where is in the proximity of a top side of said bearing and said shaft and the other end connected to a lubricant container beneath said bearing so as to form a guiding path dedicated to backflow and cycle a lubricant wherein a second slot is disposed in said lubricant container where corresponds to a bottom side of said bearing and is connected to a proximity of said shaft; and wherein a washer having a center hole for inserting in said shaft is disposed in said lubricant container beneath said bearing, and said second slot is located on said washer where corresponds to said bearing with both sides of said second slot connected to said center hole and an outer rim of said washer respectively.

2. The motor lubricant cycling system of claim 1, wherein a blocking part is disposed in said lubricant container beneath said bearing and has a center hole for inserting in said shaft, and said second slot traverses said blocking part and is connected to said center hole.

3. The motor lubricant cycling system of claim 1, wherein a blocking part is disposed on top of said bearing and has a center hole for inserting in said shaft, and a second slot traverses said blocking part and is connected to said center hole.

4. The motor lubricant cycling system of claim 1, wherein a washer is disposed on top of said bearing and has a center hole for inserting in said shaft, and a plurality of second slots are disposed on said washer where is in contact with said bearing with both ends of said second slot connected to said center hole and an outer rim of said washer respectively.

5. The motor lubricant cycling system of claim 1, wherein said shaft tube is a metal tube disposed on a shaft holder, a shaft sleeve is disposed in said metal tube, said bearing is disposed in said shaft sleeve, a blocking part and a washer are disposed above and beneath said bearing respectively, said blocking and said washer have a first center hole and a second center hole respectively for inserting in said shaft, said first slot is located on an inner wall inside said shaft sleeve in contact with said bearing, one end of said second slot traverses said blocking part and is connected to said first center hole, a surface of said washer in contact with said bearing is also disposed a plurality of second slots with both ends connected to said second center hole and an outer rim of said washer respectively.

6. The motor lubricant cycling system of claim 1, wherein said second slot of said washer is aligned in a radial form of an arc.

7. The motor lubricant cycling system of claim 1, wherein an outer ring slot is disposed on said outer rim.

8. The motor lubricant cycling system of claim 1, wherein a plurality of raised strips in form of a radial alignment are disposed on said washer so as to form a relatively wider second slot between two neighboring said raised strips.

9. The motor lubricant cycling system of claim 6, wherein a plurality of toothed fasteners for fixing said shaft are disposed inside said center hole of said washer.

* * * * *

UNITED STATES PATENT AND TRADEMARK OFFICE
CERTIFICATE OF CORRECTION

PATENT NO. : 7,600,919 B2 Page 1 of 1
APPLICATION NO. : 11/222944
DATED : October 13, 2009
INVENTOR(S) : Hong et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1065 days.

Signed and Sealed this

Fifth Day of October, 2010

David J. Kappos
*Director of the United States Patent and Trademark Office*